United States Patent [19]
Spisak

[11] 3,869,175
[45] Mar. 4, 1975

[54] HUB CAP FOR VEHICLE WHEELS

[75] Inventor: Edward G. Spisak, Westland, Mich.

[73] Assignee: S & S Product Engineering Service, Inc., Wyandotte, Mich.

[22] Filed: Aug. 2, 1973

[21] Appl. No.: 386,390

[52] U.S. Cl.......... 301/37 R, 301/37 C, 301/37 CM
[51] Int. Cl............................................. B60b 7/00
[58] Field of Search.. 301/37 R, 37 T, 37 C, 37 SA, 301/37 CM, 37 CD, 37 TP, 9 DN, 108 R, 301/37 P, 37 AT, 37 B

[56] References Cited
UNITED STATES PATENTS
2,239,366  4/1941  Lyon................................ 301/37 C
2,455,151  11/1948  Wood............................. 301/37 CD
3,012,822  12/1961  Mulhern........................... 301/37 R
3,671,076  6/1972  Aske, Jr. .......................... 301/37 P Primary Examiner—M. Henson Wood
Assistant Examiner—Victor N. Sakran
Attorney, Agent, or Firm—Fisher & Gerhardt

[57] ABSTRACT

A two piece hub cap assembly for a vehicle wheel has an outer decorative cap that is formed around an attaching ring. The ring has resilient attaching fingers that engage corresponding fingers secured to a wheel and located between the conventional stud holes on the wheel. The ring has relieved portions whose edges engage wheel nuts on the studs to prevent spinning off of the cap.

4 Claims, 4 Drawing Figures

PATENTED MAR 4 1975 3,869,175

HUB CAP FOR VEHICLE WHEELS

This invention relates to vehicle wheel caps and more particularly to hub caps easily but securely fastened to a wheel.

Decorative caps for covering the hubs of vehicle wheels such as truck wheels should be easy to manufacture, easy to attach to the wheel, easy to remove when desired but resistant to accidental removal, particularly by spinoff.

It is therefore an object of the invention to provide a wheel cap that meets the above requirements.

This and other objects and advantages will be readily apparent from the following description and accompanying drawing in which.

Figure 1:
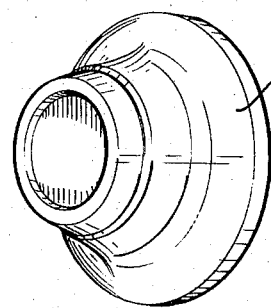
FIG. 1 is a perspective view of the exterior of the subject hub cap with wheel parts broken away.
Figure 2:
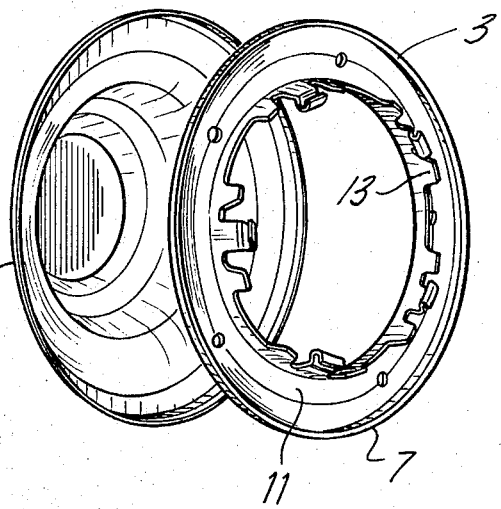
FIG. 2 is a perspective view of the two parts of the FIG. 1 hub cap as observed from the inside and prior to assembly.
Figure 3:
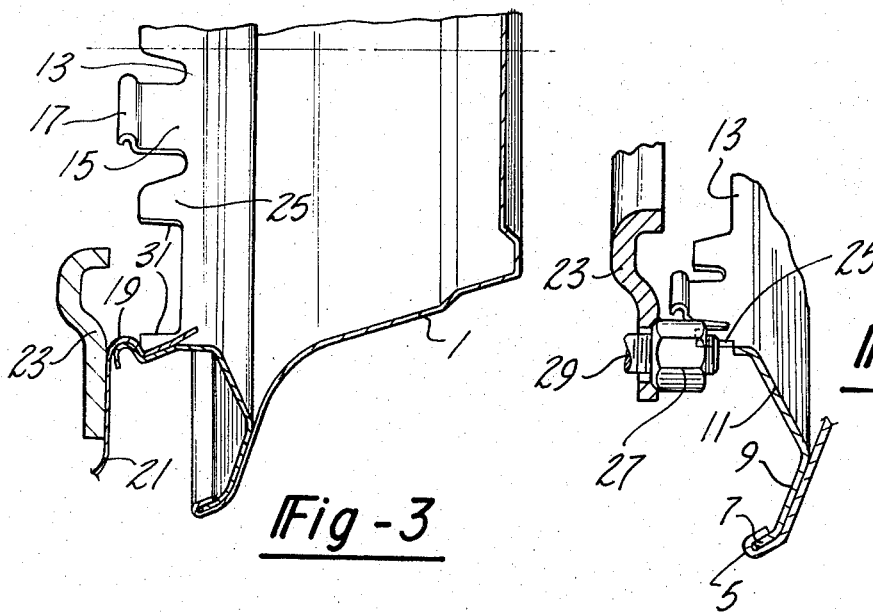
FIG. 3 is an enlarged fragmentary vertical sectional view with parts broken away, showing the hub cap attached to a wheel.
Figure 4:
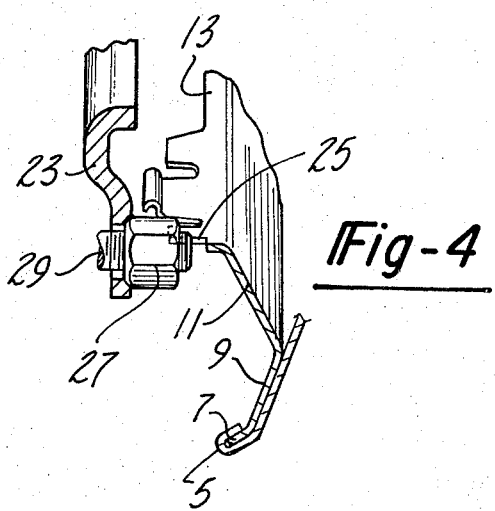
FIG. 4 is a view similar to FIG. 3 taken along a radial line adjacent to that of FIG. 3 so as to show one of the wheel attaching studs.

The subject hub cap assembly is formed from two stamped pieces as shown in FIG. 2 including an outer decorative cap 1 and an inner ring-like attaching member 3. The attaching member 3 and cap 1 are joined together as seen in FIG. 4 by rolling the outer peripheral edge 5 of the cap 1 over the outer peripheral edge 7 of the ring member 3. The edge 7 is formed on an outer angularly extending portion 9 of an angularly extending flange 11 which also includes an annular portion 13.

The annular portion 13 is formed to include a plurality of elongated spaced apart resilient fingers 15 extending therefrom. The fingers 15 have curved outer ends 17 that snap over similarly curved portions 19 on resilient fingers 21 suitably secured in any well known way, such as welding, not shown, to the conventional disc portion 23 of a vehicle wheel. Also formed on the portion 13 and spaced on either side of the fingers 15, are fingers 25. The relieved portion between the fingers 25 serves as a clearance for the wheel nuts 27 threaded on wheel attaching elements or studs 29 extending from the vehicle hub, not shown.

These fingers 25 and the edges thereof are, as viewed in FIG. 4, at approximately the same radial outward distance from the wheel axis as the studs 29. Therefore, when the hub cap assembly is attached to the wheel the edges 31 of the fingers 25 act as stops to limit rotation of the hub cap assembly relative to the wheel. Such relative rotation is the main cause for caps coming off during operation of a vehicle.

Various modifications and changes will be obvious and readily apparent to those skilled in the art and such modifications and changes are deemed to be within the scope of the invention which is limited only by the following claims:

I claim:

1. A hub cap assembly for attachment to a vehicle wheel having a plurality of circumferentially spaced holes for receiving threaded wheel attaching elements to which attach wheel fastening nuts and a plurality of resilient fingers attached to the wheel between said holes, said assembly including an outer decorative cap and an inner ring member attached to the cap, the ring member having an annular axially extending flange, a plurality of circumferentially spaced resilient fingers extending from the annular flange and adapted to engage the fingers on the wheel, a plurality of cut-away sections on said flange between said fingers and adapted to fit over wheel fastening nuts threaded on said threaded wheel attaching elements, the sections each defining stops positioned at approximately the same radial outward distance from the axis of the wheel as the nuts so that the nuts cooperate with the edges to prevent relative rotation between the wheel and the hub cap assembly.

2. The hub cap assembly of claim 1 wherein said outer decorative cap includes an outer flange bent around the outer edge of a radially extending flange formed on the ring member.

3. The hub cap assembly of claim 1 wherein said resilient fingers extending from said annular flange include curved end portions extending radially inward adapted to engage a corresponding curved portion on the fingers attached to the wheel.

4. A hub cap and wheel assembly including a wheel having a plurality of circumferentially spaced mounting holes, a plurality of resilient fingers attached to the wheel and located between at least some of the holes, a hub cap assembly having an annular flange, a plurality of resilient fingers extending from said flange and having portions thereof in holding engagement with the resilient fingers on the wheel, stop means on said flange between said resilient fingers extending therefrom and located at approximately the same radial outward distance from the wheel axis as said holes so as to engage wheel attaching means extending through said holes and thereby prevent relative rotation between the hub cap and wheel.

* * * * *